US011659930B1

(12) United States Patent
Chen et al.

(10) Patent No.: US 11,659,930 B1
(45) Date of Patent: May 30, 2023

(54) FOLDABLE CHAIR

(71) Applicant: Te-Lung Chen, Tainan (TW)

(72) Inventors: Te-Lung Chen, Tainan (TW); Pin-Yi Chen, Tainan (TW); Pin-Han Chen, Tainan (TW)

(73) Assignee: Chen Te-Lung, Tainan (TW)

( * ) Notice: Subject to any disclaimer, the term of this patent is extended or adjusted under 35 U.S.C. 154(b) by 59 days.

(21) Appl. No.: 17/532,330

(22) Filed: Nov. 22, 2021

(51) Int. Cl.
*A47C 4/28* (2006.01)
*A47C 4/30* (2006.01)
*A47C 1/026* (2006.01)
*B62B 7/08* (2006.01)
*A61G 5/08* (2006.01)
*B62B 7/06* (2006.01)

(52) U.S. Cl.
CPC ............ *A47C 4/286* (2013.01); *A47C 1/0265* (2013.01); *A47C 4/283* (2013.01); *A47C 4/30* (2013.01); *A61G 5/0816* (2016.11); *B62B 7/06* (2013.01); *B62B 7/08* (2013.01); *B62B 2205/02* (2013.01)

(58) Field of Classification Search
CPC ....... A47C 4/286; A47C 1/0265; A47C 4/283; A61G 5/0816; B62B 7/06; B62B 7/08; B62B 2205/02
USPC .............................. 297/28, 35, 42, 46; 280/42
See application file for complete search history.

(56) References Cited

U.S. PATENT DOCUMENTS

| 291,062 | A | * | 1/1884 | Latour | 297/42 |
| 3,736,021 | A | * | 5/1973 | MacLaren | A61G 5/085 |
| | | | | | 297/42 |
| 6,840,574 | B1 | * | 1/2005 | Wu | A47C 1/0265 |
| | | | | | 297/188.14 |
| 6,843,499 | B2 | * | 1/2005 | Guo | B62B 7/083 |
| | | | | | 297/42 |
| 9,451,829 | B2 | * | 9/2016 | Chen | A47C 4/286 |
| 10,631,648 | B1 | * | 4/2020 | Tsai | A47C 4/286 |
| 11,096,493 | B1 | * | 8/2021 | Tsai | A47C 4/286 |
| D955,131 | S | * | 6/2022 | Sullivan | D6/368 |
| 2006/0131841 | A1 | * | 6/2006 | Huang | B62B 7/08 |
| | | | | | 280/647 |
| 2009/0243260 | A1 | * | 10/2009 | Longenecker | B62B 7/145 |
| | | | | | 280/642 |
| 2010/0237665 | A1 | * | 9/2010 | Grace | A47C 4/286 |
| | | | | | 297/16.2 |
| 2012/0175917 | A1 | * | 7/2012 | Chen | A47C 4/286 |
| | | | | | 297/29 |

(Continued)

FOREIGN PATENT DOCUMENTS

JP       2021062019 A  *  4/2021
TW          I522071 B      2/2016

*Primary Examiner* — Robert Canfield

(74) *Attorney, Agent, or Firm* — Muncy, Geissler, Olds & Lowe, P.C.

(57) ABSTRACT

A foldable chair includes backrest rods hinged to a seat unit, leg units, armrest units, a first foldable rod unit, and a linking rod unit. Each leg unit includes a sleeve member connected to the seat unit and slidably sleeved on a rear leg rod connected to the seat unit. Each armrest unit is connected to one of the leg units and one of the backrest rods. The first foldable rod unit is connected between the backrest rods to move the backrest rods. The linking rod unit includes an end connected to the first foldable rod unit, and another end pivotally connected to one of the backrest arm units, or one of the sleeve members of the leg units.

10 Claims, 20 Drawing Sheets

(56) References Cited

U.S. PATENT DOCUMENTS

| | | | |
|---|---|---|---|
| 2016/0100688 A1* | 4/2016 | Grace | A47C 1/14 |
| | | | 297/17 |
| 2016/0135600 A1* | 5/2016 | Chen | A47C 1/0265 |
| | | | 297/42 |
| 2016/0296023 A1* | 10/2016 | Choi | A47C 4/286 |
| 2017/0202355 A1* | 7/2017 | Reed | A47C 1/16 |
| 2017/0224116 A1* | 8/2017 | Choi | A47C 4/286 |
| 2020/0187656 A1* | 6/2020 | Winterhalter | A47C 4/286 |
| 2022/0354257 A1* | 11/2022 | Winterhalter | A47C 4/286 |

\* cited by examiner

FOLDABLE CHAIR

FIELD

The disclosure relates to a chair, and more particularly to a foldable chair.

BACKGROUND

FIGS. 1 to 3 illustrate a foldable chair disclosed in Taiwanese Patent Publication No. I522071. The foldable chair is paired with a cloth material 11, and includes a seat unit 12, a backrest unit 13, two leg units 14, two armrest units 15, a first foldable rod unit 16, a second foldable rod unit 17, and a pull rod unit 18.

The seat unit 12 includes two seat rods 121 spaced apart from each other in a left-right direction and extending in a front-rear direction.

The backrest unit 13 is disposed above and pivotally connected to the seat unit 12, and includes two backrest rods 131 spaced apart from each other in the left-right direction and extending in a top-bottom direction.

Each leg unit 14 includes a front leg 141 pivotally connected to one of the seat rods 121, a rear leg 142 having a top end pivotally connected to the front leg 141, and a sleeve member 143 slidably sleeved on the rear leg 141 and pivotally connected to one of the seat rods 121. The front and rear legs 141, 142 cooperate with each other to from an inverted V-shape to support one of the armrest units 15.

Each of the first and second foldable rod units 16, 17 includes a hinge seat 191 and two connection rods 192. The hinge seat 191 is disposed between the backrest rods 131. Each connection rod 192 is pivotally connected between the hinge seat 191 and one of the backrest rods 131.

The pull rod unit 18 is pivotally connected between the hinge seats 191 of the first and second foldable rod units 16, 17 to be movable together with the hinge seats 191 and the connection rods 192 of the first and second foldable rod units 16, 17.

As shown in FIGS. 2 to 4, the foldable chair can be operated between a stretched state (see FIGS. 2 and 3) and a folded state (see FIG. 4).

In the stretched state, because the connection rods 192 of the first and second foldable rod units 16, 17 are aligned with their respective left and right pivot points along the same line, the first and second foldable rod units 16, 17 are at a dead point position and can stably support the backrest unit 13 and the entire structure of the foldable chair. When the pull rod unit 18 is pulled upwardly, the hinge seats 191 of the first and second foldable rod units 16, 17 are moved upwardly together with the pull rod unit 18 and drive the connection rods 192 of each of the first and second foldable rod units 16, 17 to move closer to each other so that the dead points disappear and the foldable chair is operated from the stretched state to the folded state.

However, to move the foldable chair between the stretched and folded states, it is inconvenient that a user has to move rearward for operating the pull rod unit 18 behind the foldable chair.

SUMMARY

Therefore, an object of the disclosure is to provide a foldable chair that can alleviate the drawback of the prior art.

According to the disclosure, a foldable chair includes a seat unit, a backrest unit, two leg units, two armrest units, a first foldable rod unit, and at least one linking rod unit.

The backrest unit includes two backrest rods spaced apart from each other in a left-right direction and disposed above and hinged to the seat units.

The leg units are spaced apart from each other in the left-right direction. Each of the leg units includes a front leg rod pivotally connected to the seat unit, a rear leg rod pivotally connected to the front leg rod, and a sleeve member pivotally connected to the seat unit and slidably sleeved on the rear leg rod.

Each of the armrest units is pivotally connected to one of the leg units and one of the backrest rods.

The first foldable rod unit is pivotally connected between the backrest rods and is foldable or unfoldable to move the backrest rods toward or away from each other.

The at least one linking rod unit includes an end pivotally connected to the first foldable rod unit, and another end pivotally connected to one of the backrest arm units and the sleeve members of the leg units.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
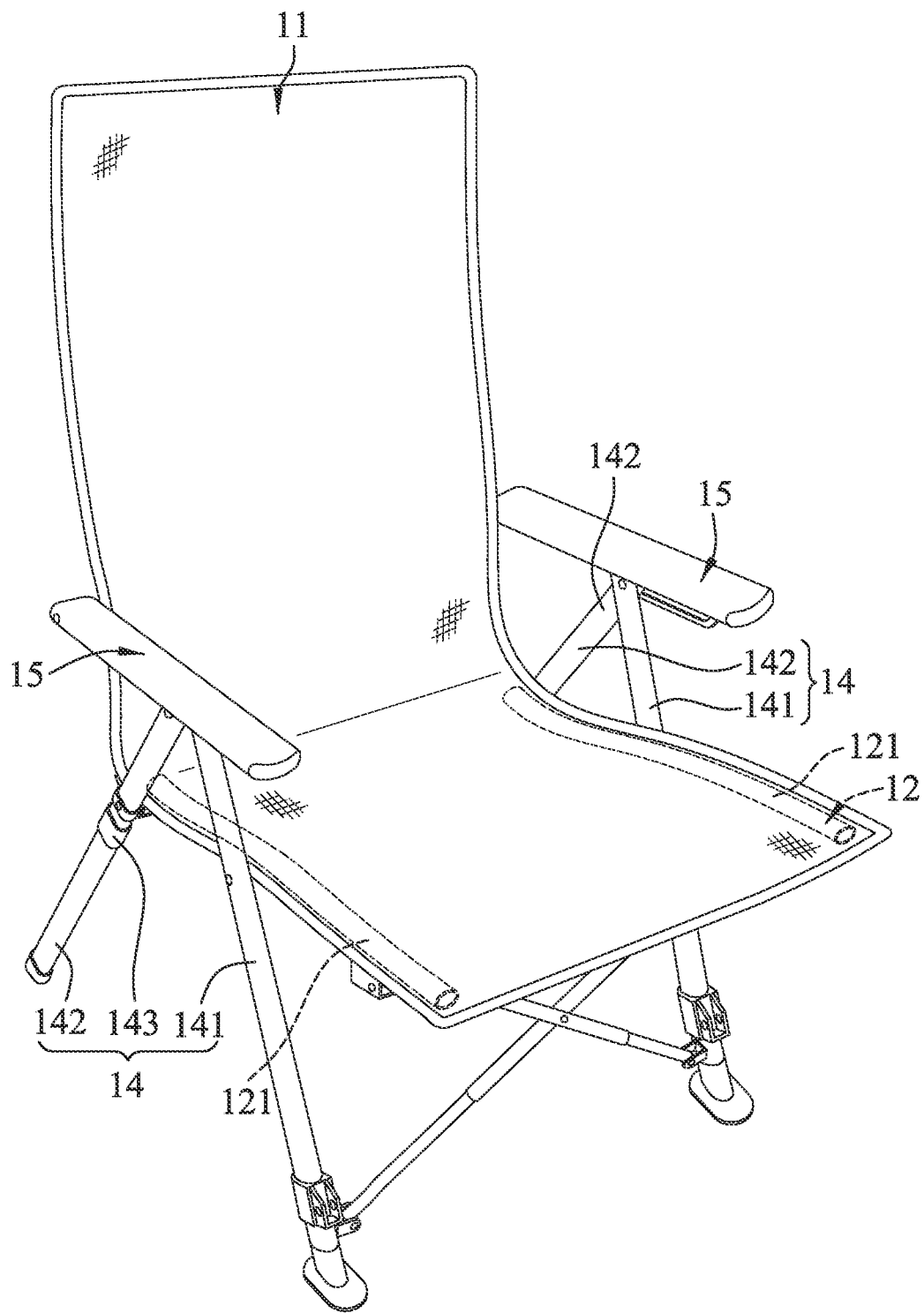
FIG. 1 is a perspective view illustrating an existing foldable chair.
Figure 2:
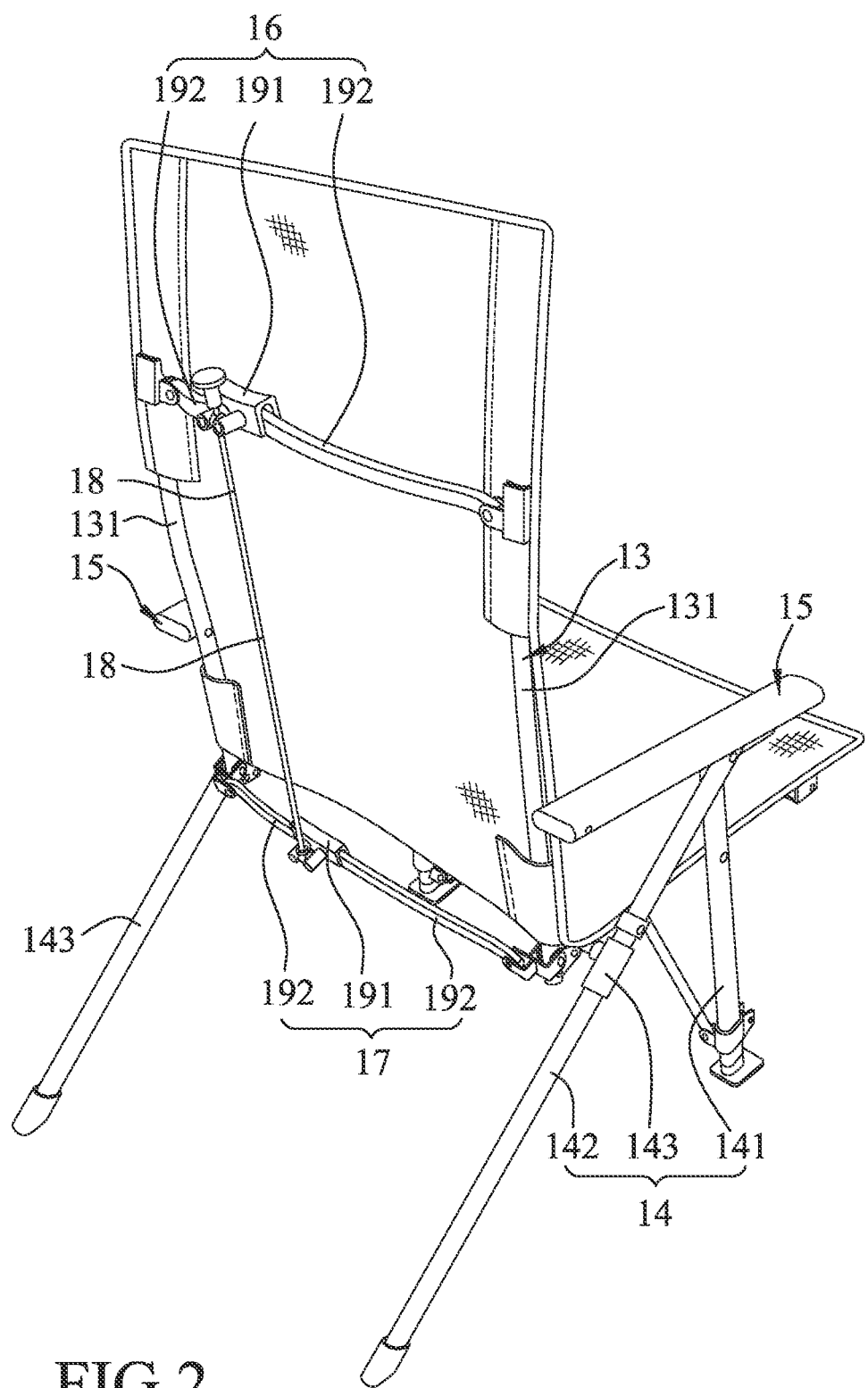
FIG. 2 is a perspective view of the existing foldable chair viewed from a different angle.
Figure 3:
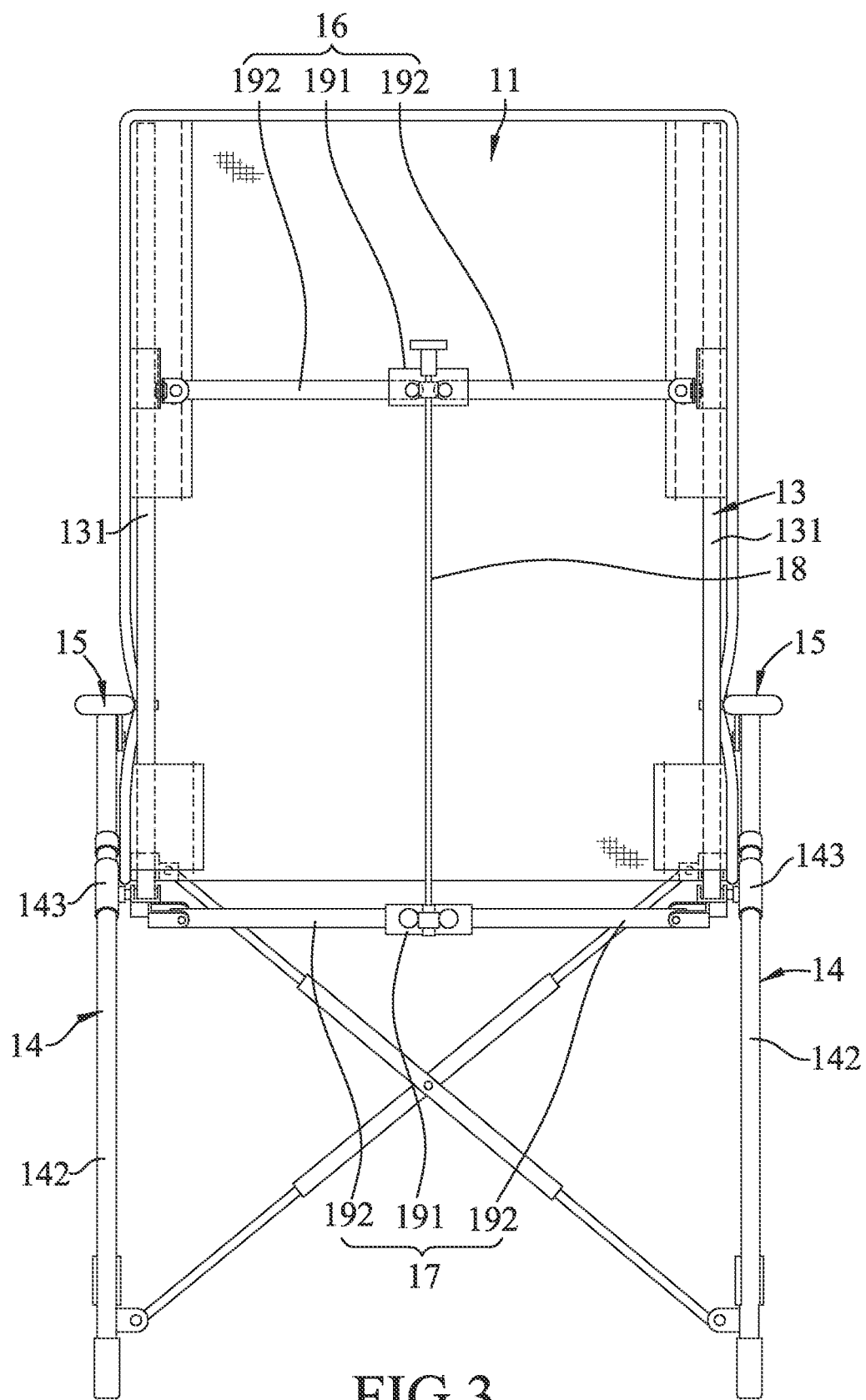
FIG. 3 is a rear view of the existing foldable chair in a stretched state.
Figure 4:
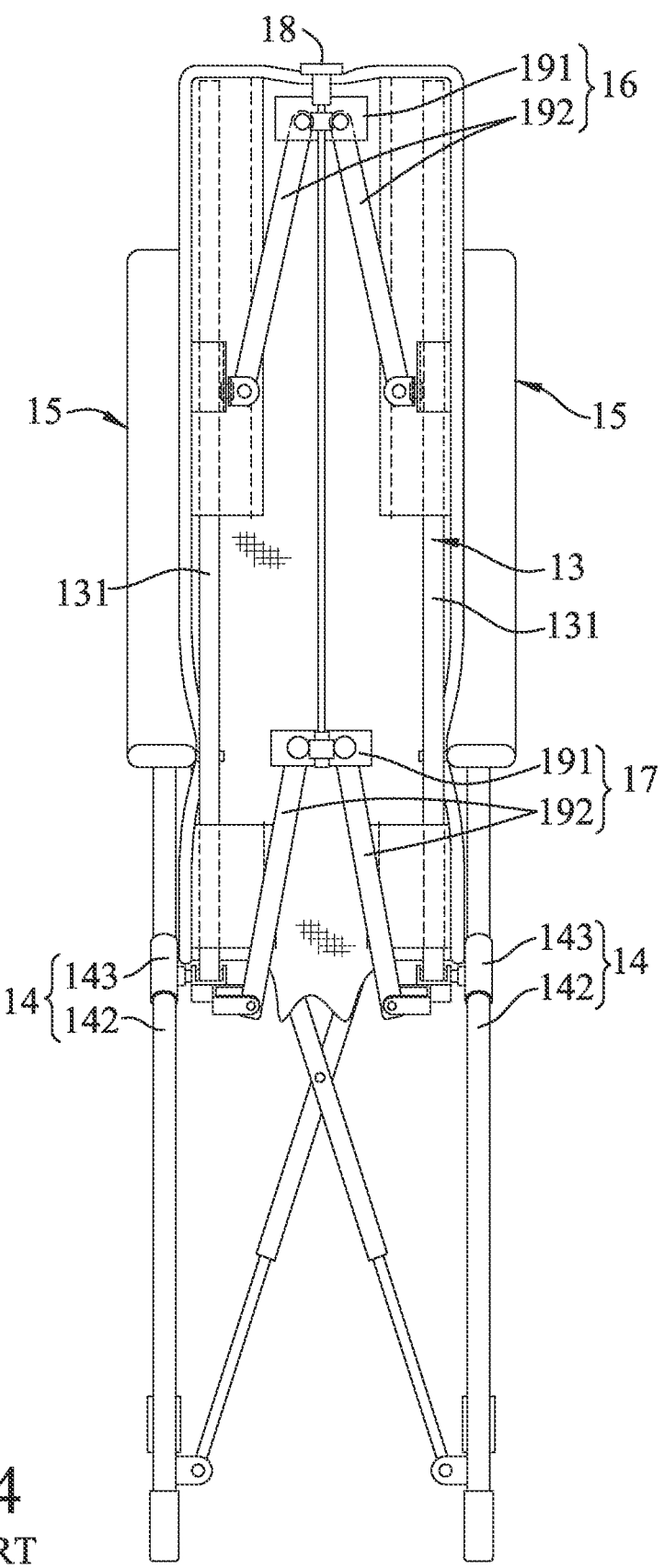
FIG. 4 is a rear view of the existing foldable chair in a folded state.

Before the disclosure is described in greater detail, it should be noted that where considered appropriate, reference numerals or terminal portions of reference numerals have been repeated among the figures to indicate corresponding or analogous elements, which may optionally have similar characteristics.

Figure 5:
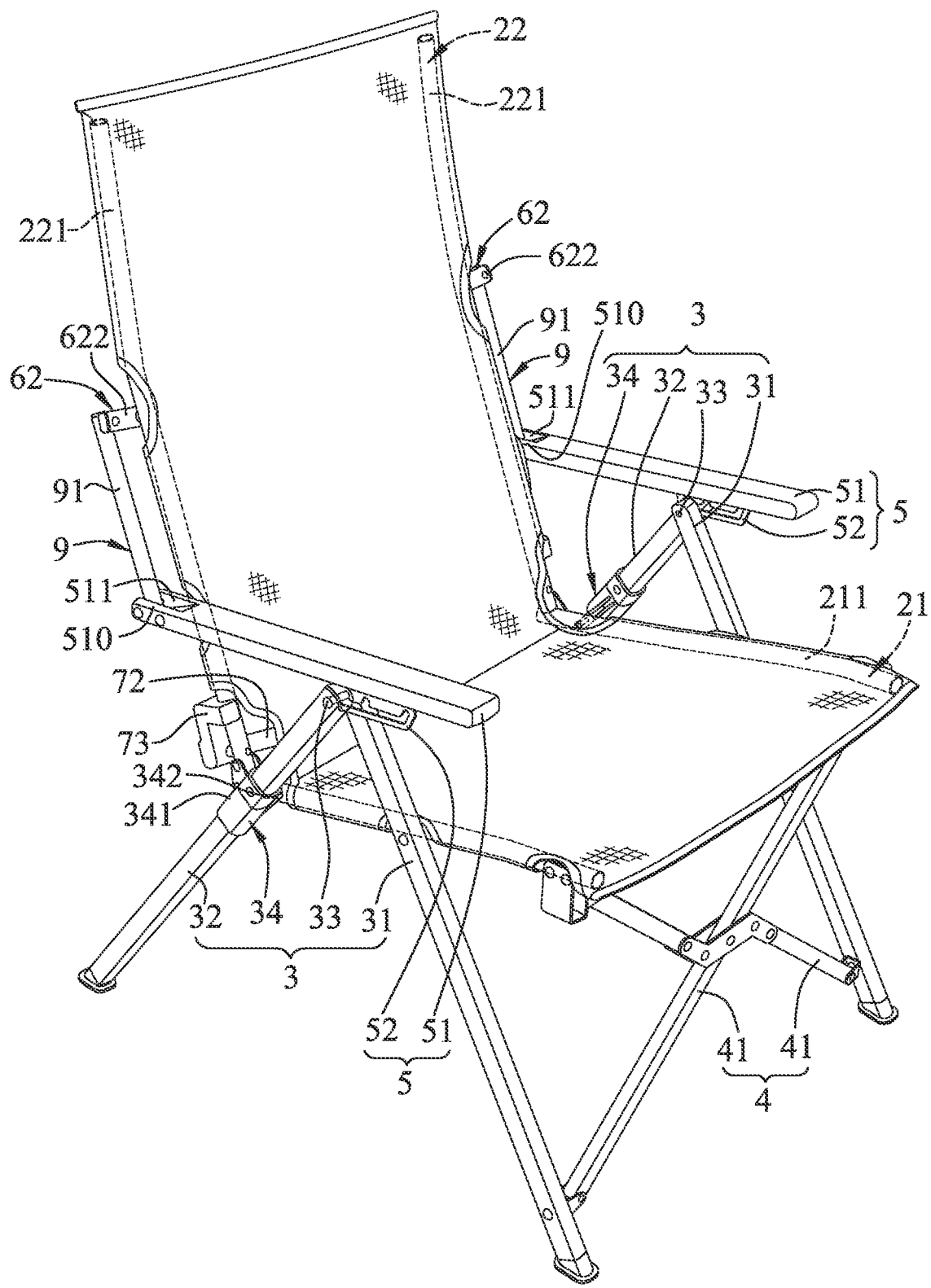
FIG. 5 is a perspective view illustrating a foldable chair according to a first embodiment of the disclosure in a stretched state.
Figure 6:
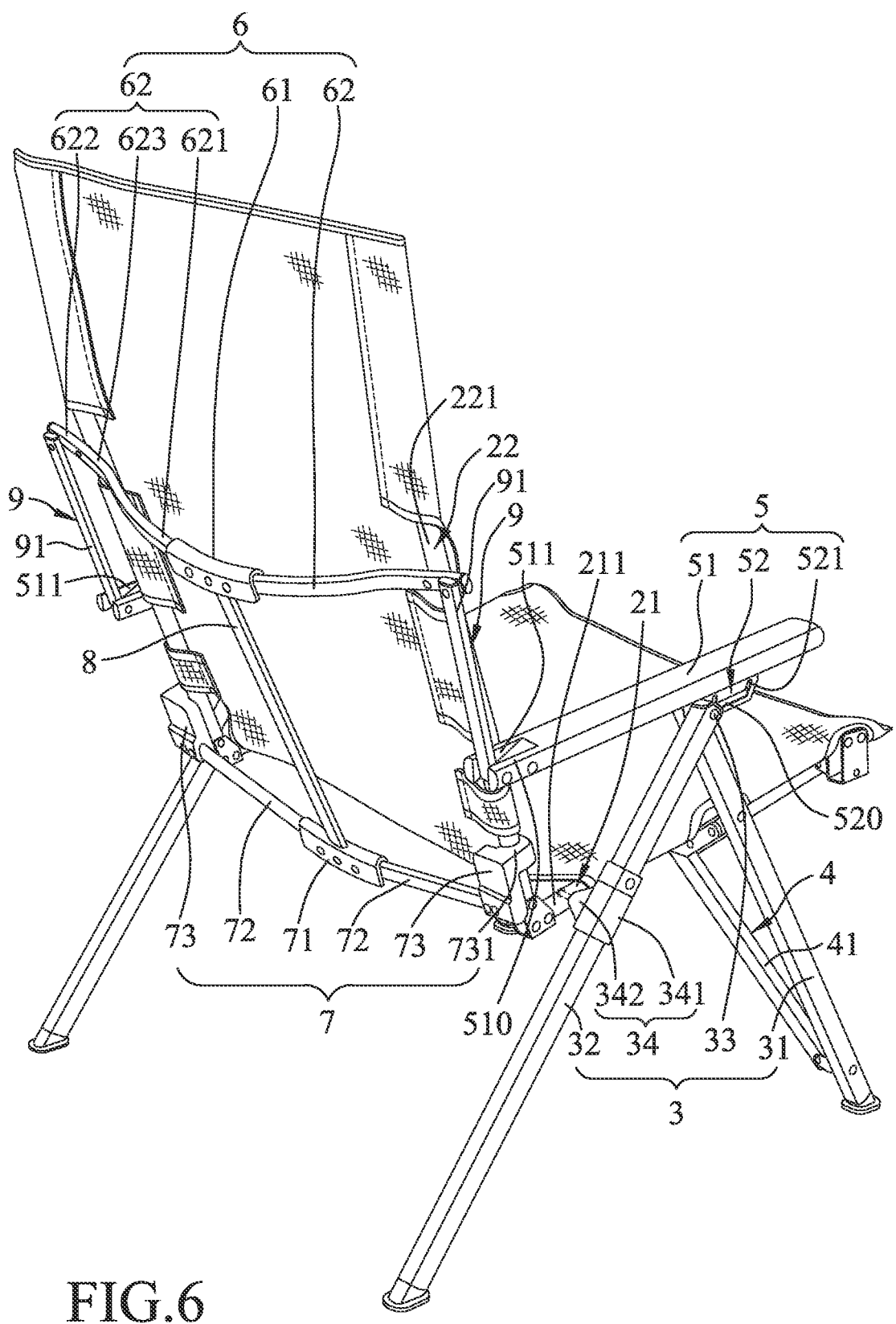
FIG. 6 is another perspective view of the first embodiment viewed from a different angle in the stretched state.
Figure 7:
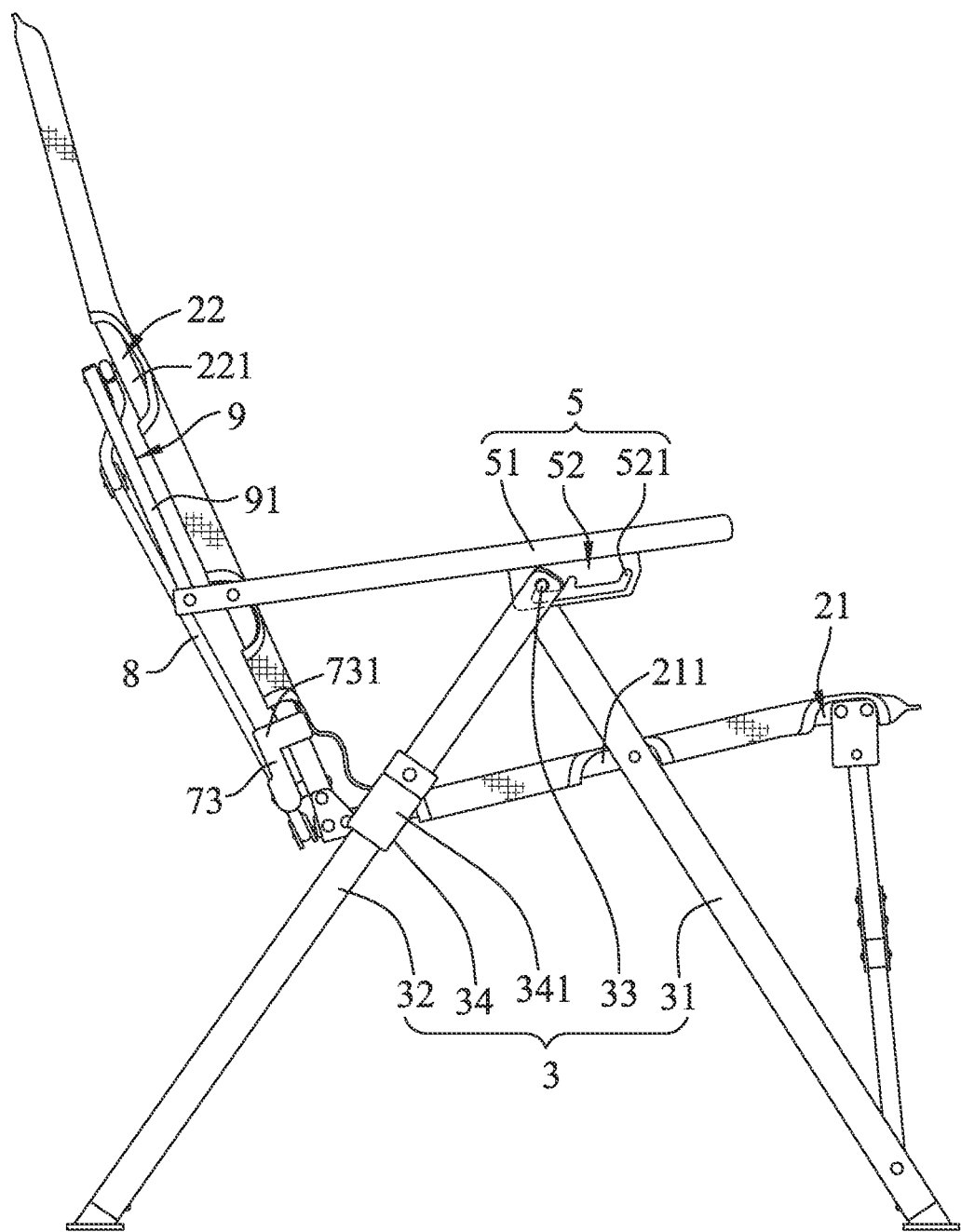
FIG. 7 is a side view of the first embodiment illustrating the foldable chair in the stretched state.

FIGS. 5 to 7 illustrate a foldable chair according to a first embodiment of the disclosure provided with a chair cloth.

The foldable chair includes a seat unit 21, a backrest unit 22, two leg units 3, a scissor linkage unit 4, two armrest units 5, a first foldable rod unit 6, a second foldable rod unit 7, a third rod unit 8, and two linking rod units 9.

The seat unit 21 includes two seat rods 211 spaced apart from each other in a left-right direction. Each seat rod 211 extends in a front-rear direction.

The backrest unit 22 includes two backrest rods 221 spaced apart from each other in the left-right direction and disposed above the seat units 21. The backrest rods 221 are respectively hinged to rear ends of the seat rods 211.

The two leg units 3 are spaced apart from each other in the left-right direction in a manner that the seat unit 21 is disposed between the leg units 3. Each leg unit 3 includes a front leg rod 31, a rear leg rod 32, a pivot pin 33, and a sleeve member 34. The front leg rod 31 is pivotally connected at a midpoint of a respective one of the seat rods 211. Top ends of the front and rear leg rods 31, 32 are disposed above the respective seat rod 211 and pivotally connected to each other through the pivot pin 33 so that the front and rear leg rods 31, 32 can be oriented in an inverted V configuration.

The sleeve member 34 is pivotally connected to the respective seat rod 211 at a distance from the midpoint of the respective seat rod 211 and slidably sleeved on the rear leg rod 32. In this embodiment, the sleeve member 34 has a sleeve portion 341 slidably sleeved on the rear leg rod 32, and a protrusion portion 342 integrally protruding from the sleeve portion 341 and pivotally connected to the respective seat rod 211 (see FIG. 6).

The scissor linkage unit 4 is pivotally connected to front end of the seat unit 21 and bottom ends of the leg units 3. The scissor linkage unit 4 includes two scissor legs 41 crossed and pivotally connected to each other. Each scissor leg 41 has a top end pivotally connected to one of the seat rods 211, and a bottom end pivotally connected to a bottom end of the front leg rod 31 that is pivotally connected to the other one of the seat rods 211.

Each armrest unit 5 is pivotally connected to one of the leg units 3 and one of the backrest rods 221, and includes an armrest member 51 and a mounting portion 52 extending downwardly from the armrest member 51. The armrest member 51 has a rear end 510 that is bifurcated to define a notch 511 for accommodating one of the linking rod units 9. A part of the armrest member 51 anterior to the rear end 510 is pivoted to the corresponding backrest rod 221. The mounting portion 52 has a slide passage 520 for extension of the pivot pin 33 of one of the leg units 3, and a plurality of positioning grooves 521 communicating the slide passage 520. The pivot pin 33 is slidable along the slide passage 520 and can be adjustably inserted into one of the positioning grooves 521.

Figure 8:
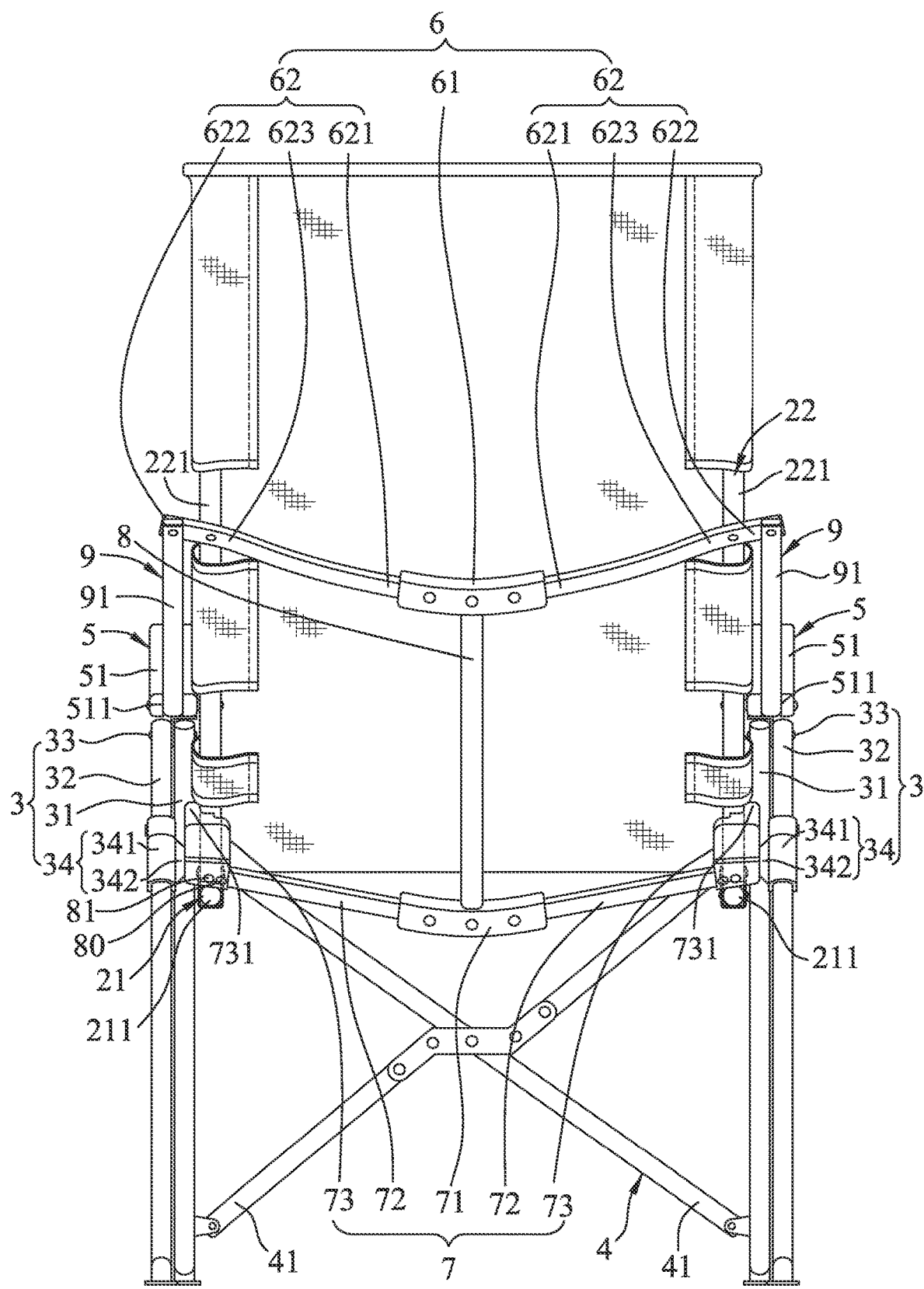
FIG. 8 is a rear view of the first embodiment illustrating the foldable chair in the stretched state.

Referring to FIGS. 6 to 8, the first foldable rod unit 6 is pivotally connected between the backrest rods 221 and is foldable or unfoldable to move the backrest rods 221 toward or away from each other. The first foldable rod unit 6 includes a first hinge seat 61 and two first rods 62.

The first hinge seat 61 is disposed between the backrest rods 221. Each first rods 62 is connected between the first hinge seat 61 and one of the backrest rods 221. In this embodiment, each first rod 62 has a first end portion 621, a second end portion 622 opposite to the first end portion 621, and an intermediate portion 623 connected between the first and second end portions 621, 622.

The first end portion 621 of each first rod 62 is pivotally connected to the first hinge seat 61. The intermediate portion 623 of each first rod 62 is pivotally connected to one of the backrest rods 221. The second end portion 622 of each first rod 62 protrudes outwardly from the respective backrest rod 221 to which the intermediate rod portion 623 is pivotally connected. As shown in FIG. 8, the second end portions 622 of the first rods 62 protrude respectively in left and right directions from the backrest rods 221.

The second foldable rod unit 7 is disposed below the first foldable rod unit 6. The second foldable rod unit 7 includes a second hinge seat 71, two third hinge seats 73, and two second rods 72.

The second hinge seat 71 is disposed between the backrest rods 221.

Each third hinge seat 73 has an engaging portion 731 capable of engaging and hooking on one of the backrest rods 221 (see FIGS. 6 and 8).

Each second rod 72 has an end pivotally connected to the second hinge seat 71, and another end indirectly and pivotally connected to one of the backrest rods 221 through the third hinge seat 73. As shown in FIG. 8, each second rod 72 and the respective third hinge seat 73 are pivotally connected to each other by a pivot pin 80; each third hinge seat 73, the respective second rod 72 and the respective backrest rod 221 are pivotally connected to each other by a pivot pin 81. By virtue of the third hinge seats 73, stability of the backrest rods 221 can be increased. However, in other embodiments, the third hinge seats 73 can be dispensed with, and each second rod 72 is directly and pivotally connected to one of the backrest rods 221.

The third rod unit 8 extends in a top-bottom direction and is pivotally connected between the first and second hinge seats 61, 71. The third rod unit 8 brings together the first and second hinge seats 61, 71 to simultaneously move the first and second rods 62, 72.

Each linking rod unit 9 include a linking rod 91. The linking rod 91 has an end pivotally connected to the second end portion 622 of one of the first rods 62, and the other end is pivotally connected to the rear end 510 of the armrest member 51 of one of the armrest units 5. Particularly, the other end of the linking rod 91 is inserted in the notch 511 of the rear end 510 of the armrest member 51 for being pivoted to the rear end 510.

Figure 9:
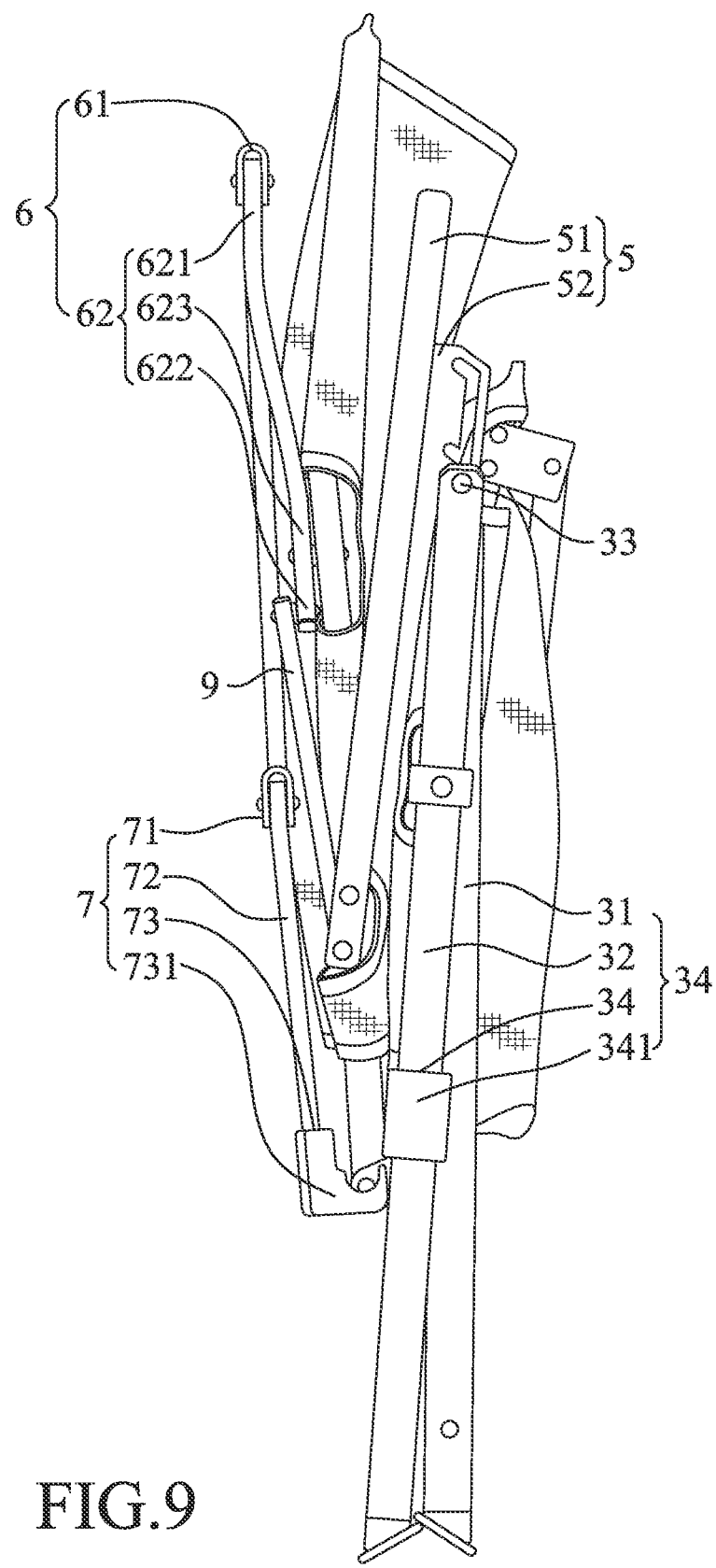
FIG. 9 is a side view of the first embodiment illustrating the foldable chair in a folded state.
Figure 10:
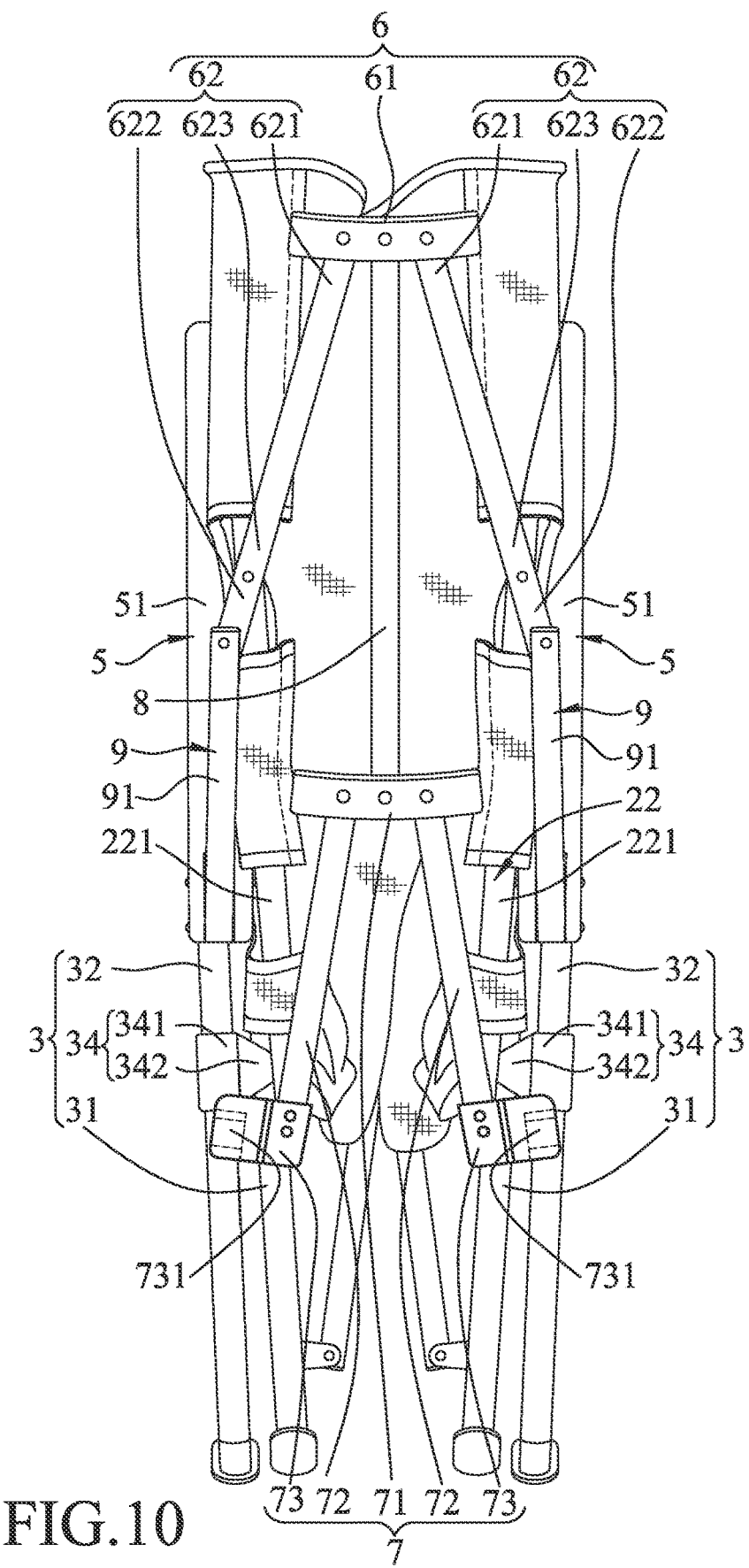
FIG. 10 is a rear view of the first embodiment illustrating the foldable chair in the folded state.

The foldable chair of the disclosure is operable between a stretched state (see FIGS. 7 and 8) and a folded state (see FIGS. 9 and 10).

As shown in FIGS. 6 to 8, in the stretched state, the front ends of the armrest members 51 respectively extend forward away from the backrest rods 221, the backrest rods 221 are moved away from each other, the first rods 62 and the second rods 72 are unfolded, and the bottom ends of the backrest rods 221 are respectively engaged with and held firmly by the engaging portion 731 of the third hinge seats 73.

To operate the foldable chair from the stretched state to the folded state, a user may stand in front of the foldable chair to lift and move the armrest units 5 toward each other and to move the front leg rods 31 of the leg units 3 toward to each other.

When the armrest units 5 are lifted and moved toward each other, the linking rods 91 of the linking rod units 9 are moved toward each other by the armrest units 5, the second end portions 622 of the first rods 62 together with the linking rod units 9 move downward and toward to each other, and the first hinge seat 61 is moved upwardly. The second hinge seat 71 and the third rod unit 8 move upwardly together with the first hinge seat 61 so that the second rods 72 move toward each other. The third hinge seats 73 are respectively moved by the second rods 72 and thus rotate relative to the backrest rods 221 so that the backrest rods 221 are disengaged from the engaging portions 731 of the third hinge seats 73. As the front leg rods 31 of the leg units 3 are pushed by the user's feet to move toward each other, the scissor legs 41 are folded and the seat rods 211 move toward each other.

Referring to FIGS. 9 and 10, in the folded state, the armrest units 5 and the backrest rods 211 are inclined relative to the top-bottom direction; the first rods 62 are oriented in an inverted V configuration; the second rods 72 are oriented in an inverted V configuration; the backrest rods 221 are disengaged from the engaging portions 731 of the third hinge seats 73.

To operate the foldable chair from the folded state to the stretched state, a user may press down and move the armrest units 5 away from each other. Movements of the armrest units 5 will cause the leg units 3, the linking rods 91, and the first and second foldable rod units 6, 7 to move concomitantly. In the stretched state, the foldable chair is totally unfolded for allowing the user to sit thereon.

The foldable chair of the disclosure is featured as follows. For operating the foldable chair, the user need not move to a rear side of the foldable chair. Rather, the user may just stand before the chair and operate the armrest units 5 and the front leg rods 31 of the leg units 3 for folding or unfolding the foldable chair.

Figure 11:
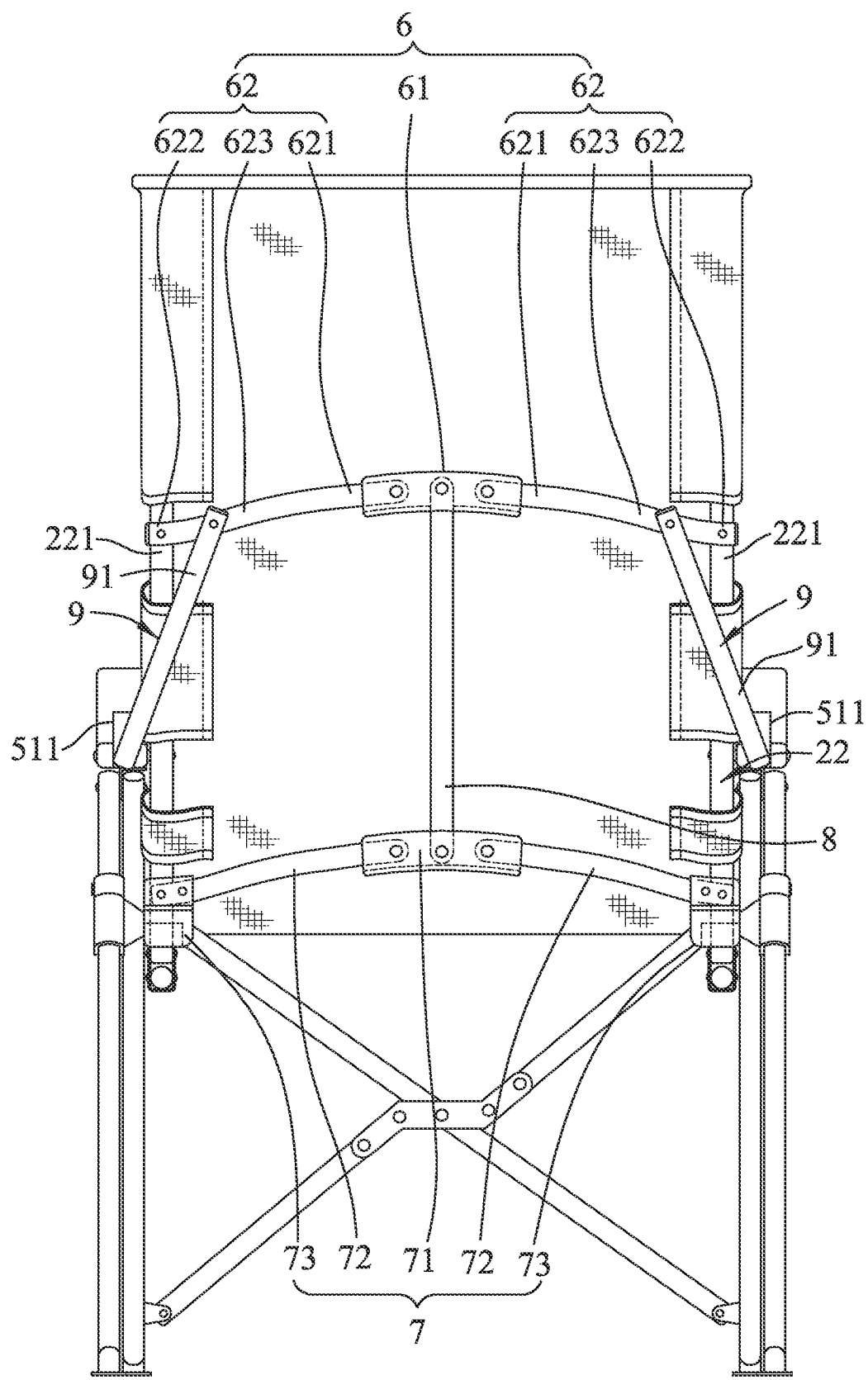
FIG. 11 is a rear view illustrating a foldable chair according to a second embodiment of the disclosure in a stretched state.
Figure 12:
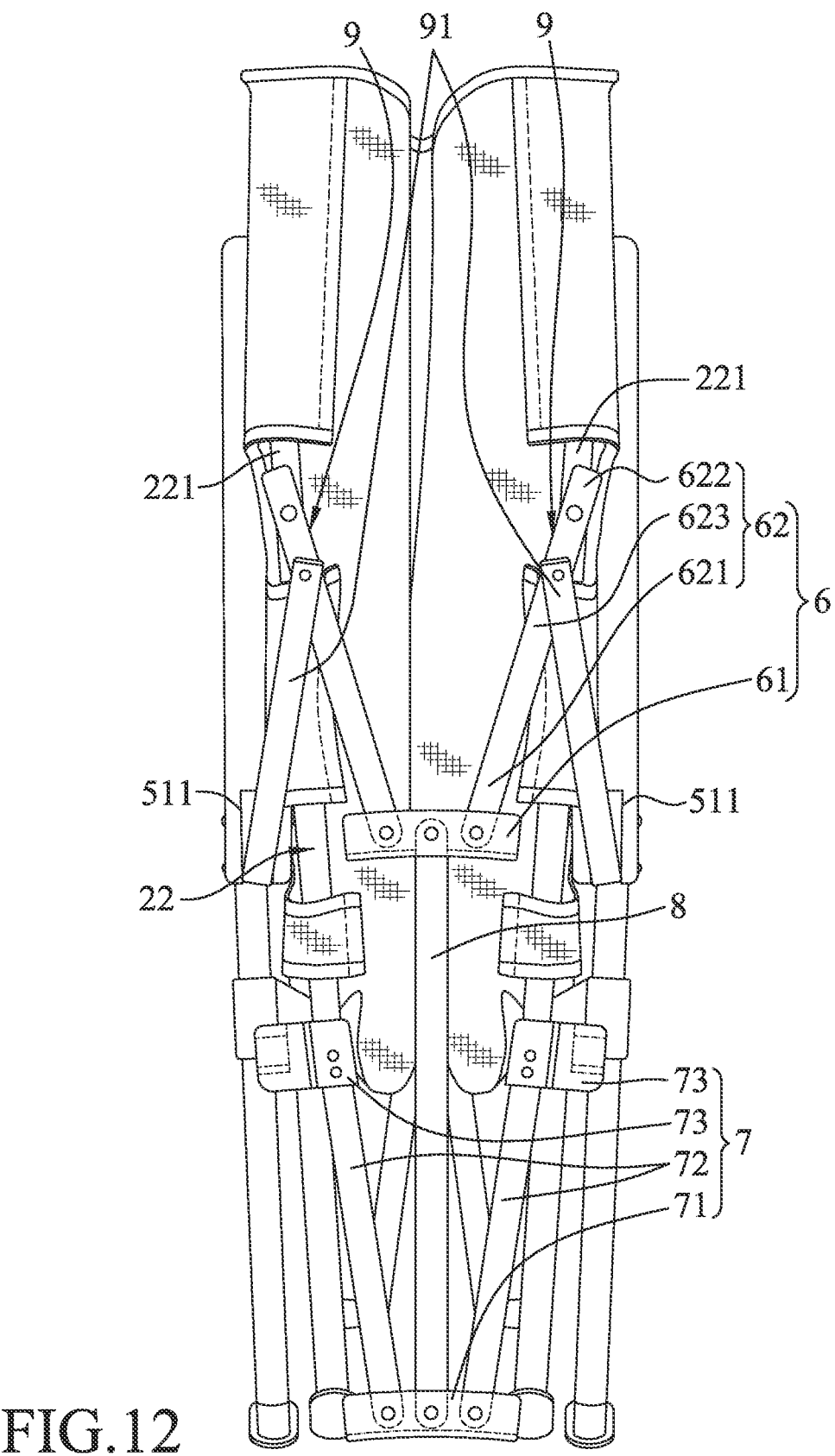
FIG. 12 is a rear view of the second embodiment illustrating the foldable chair in a folded state.

FIGS. 11 and 12 illustrate a foldable chair according to a second embodiment of the disclosure, which has a structure generally similar to that of the first embodiment. However, in this embodiment, the second end portion 622 of each first rod 62 is pivotally connected to one of the backrest rods 221. The linking rod 91 of each linking rod unit 9 is pivotally connected between a rear end of one of the armrest units 5 and the intermediate portion 623 of one of the first rods 62. The accommodation recess 511 of each armrest unit 5 is open not only rearward but also inward and toward one of the backrest rods 221, thereby facilitating movements of the linking rod units 9. The positions of the third hinge seats 73 are reversed. In the folded state, the first rods 62 are oriented in a V-shaped configuration; the second rods 72 are oriented in a V-shaped configuration.

Figure 13:
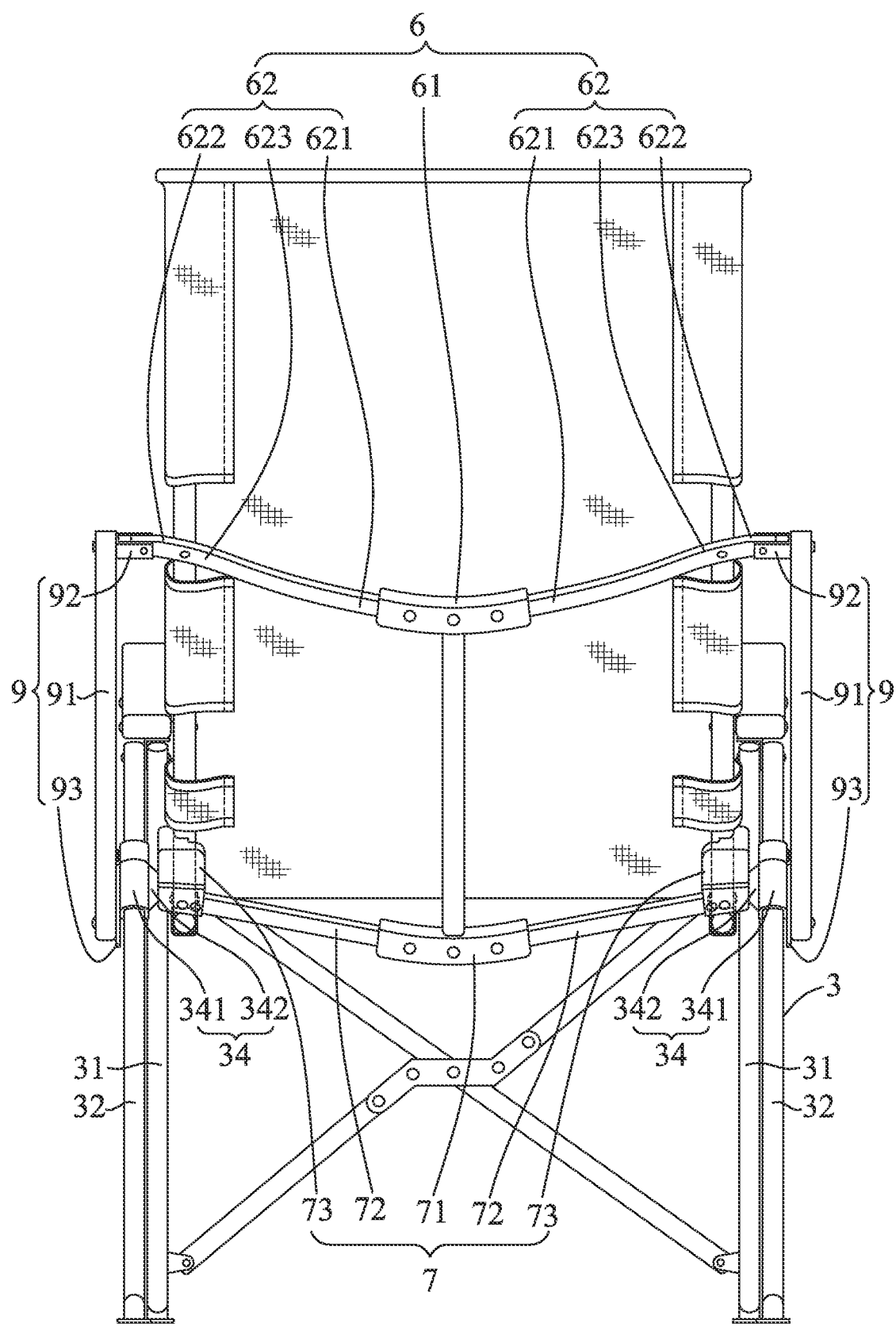
FIG. 13 is a rear view illustrating a foldable chair according to a third embodiment of the disclosure in a stretched state.
Figure 14:
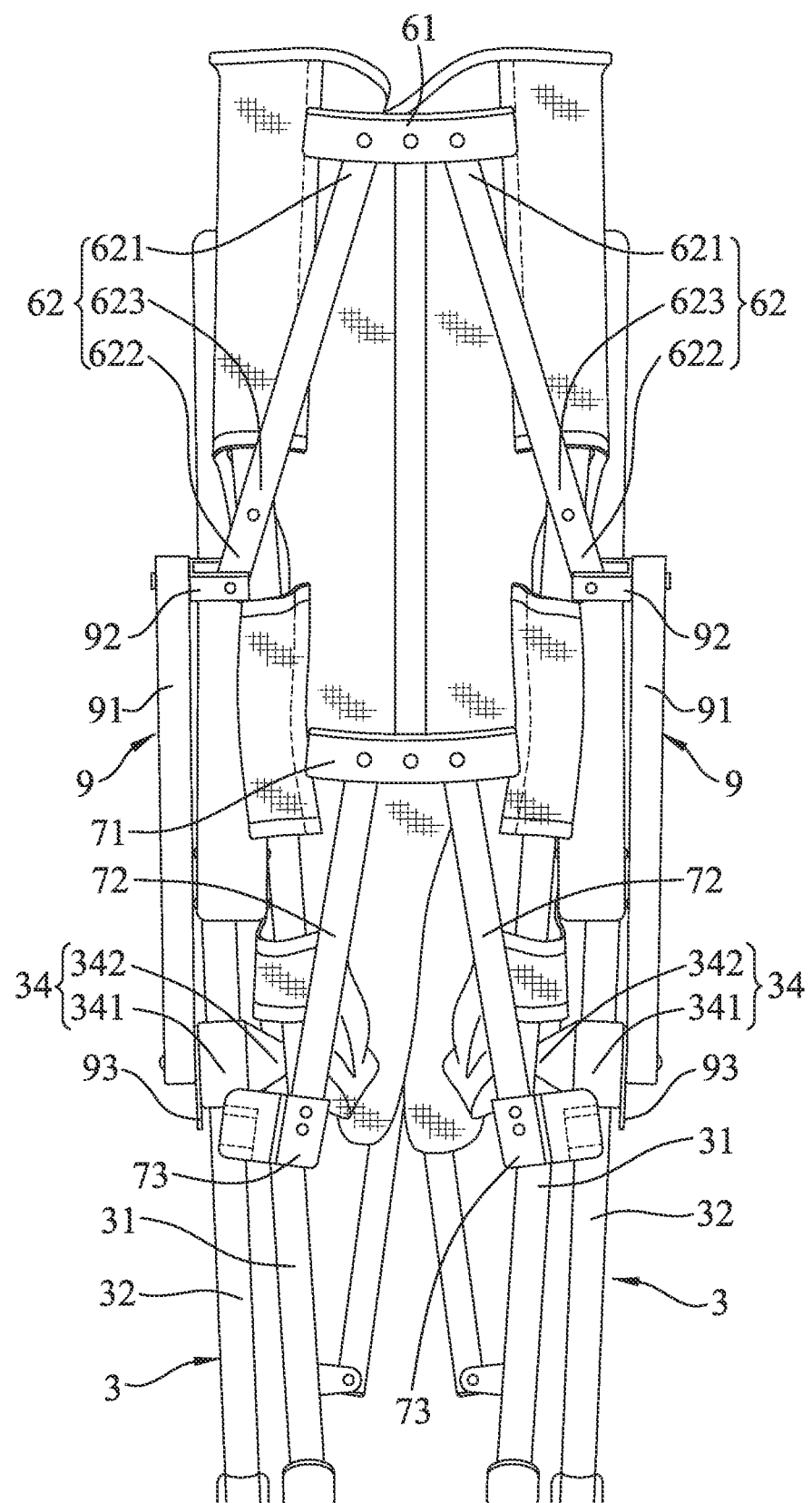
FIG. 14 is a rear view of the third embodiment illustrating the foldable chair in a folded state.

FIGS. 13 and 14 illustrate a foldable chair according to a third embodiment of the disclosure, which has a structure generally similar to that of the first embodiment. However, in this embodiment, the linking rod units 9 further includes a U-shaped connector 92 and a connecting plate 93. The U-shaped connector 92 is connected to an end of the linking rod 91 and is pivotally connected to the second end portion 622 of one of the first rods 62. The connecting plate 93 is connected to another end of the linking rod 91 and is pivotally connected to the sleeve member 34 of one of the leg units 3. Because the linking rod unit 9 and the armrest units 5 are not connected to each other, the accommodation recess 511 (see FIG. 6) is omitted from the armrest member 51 of each armrest unit 5.

Because each sleeve member 34 is slidably sleeved on the respective rear leg rod 32 and is pivotally connected to the respective seat rod 211, and because each linking rod unit 9 is pivotally connected between the respective first rod 62 and sleeve member 34, when the armrest units 5 are lifted, the sleeve members 34 are moved, bringing the linking rod unit 9 to move and causing the first foldable rod unit 6 to fold.

Figure 15:
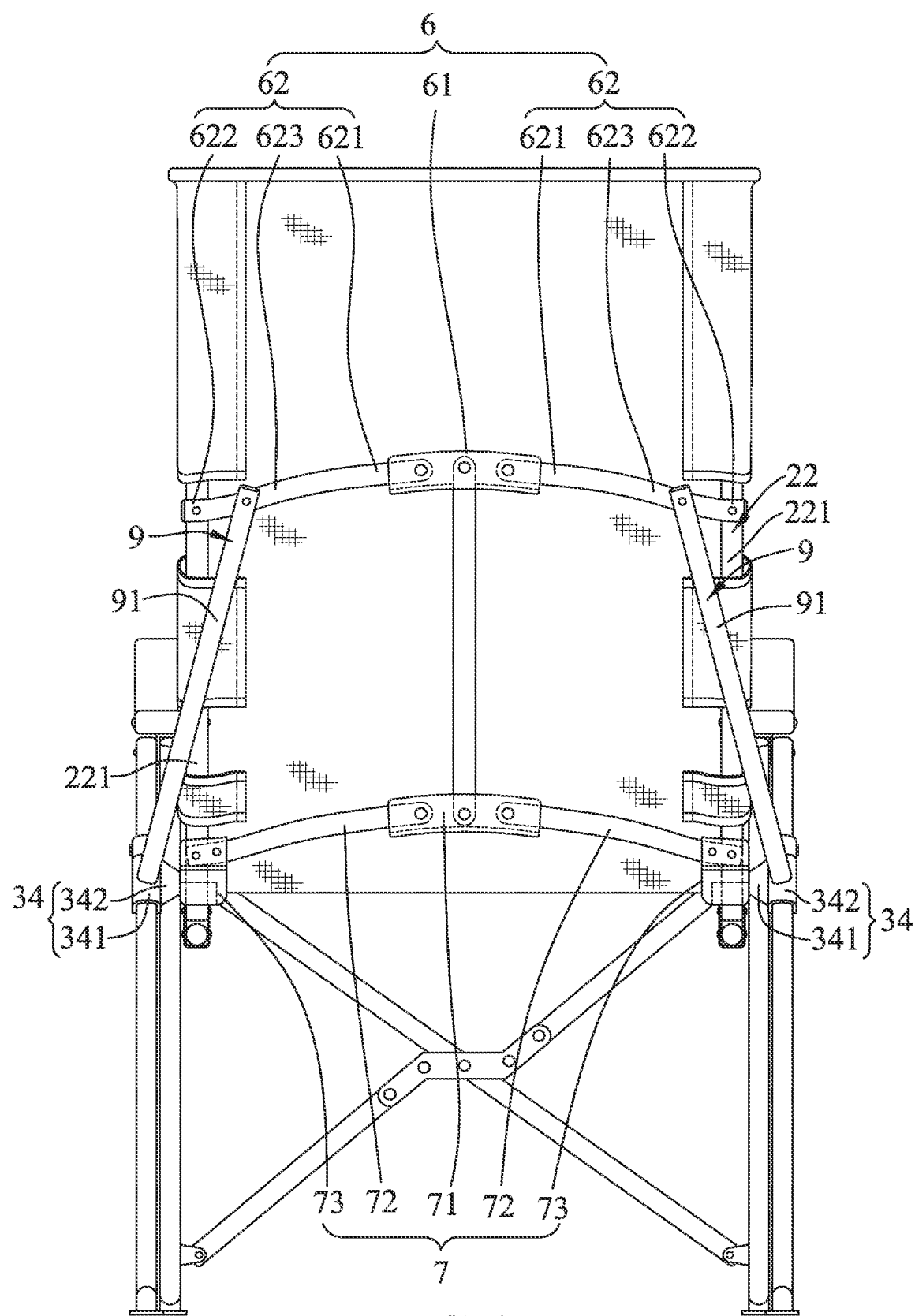
FIG. 15 is a rear view illustrating a foldable chair according to a fourth embodiment of the disclosure in a stretched state.
Figure 16:
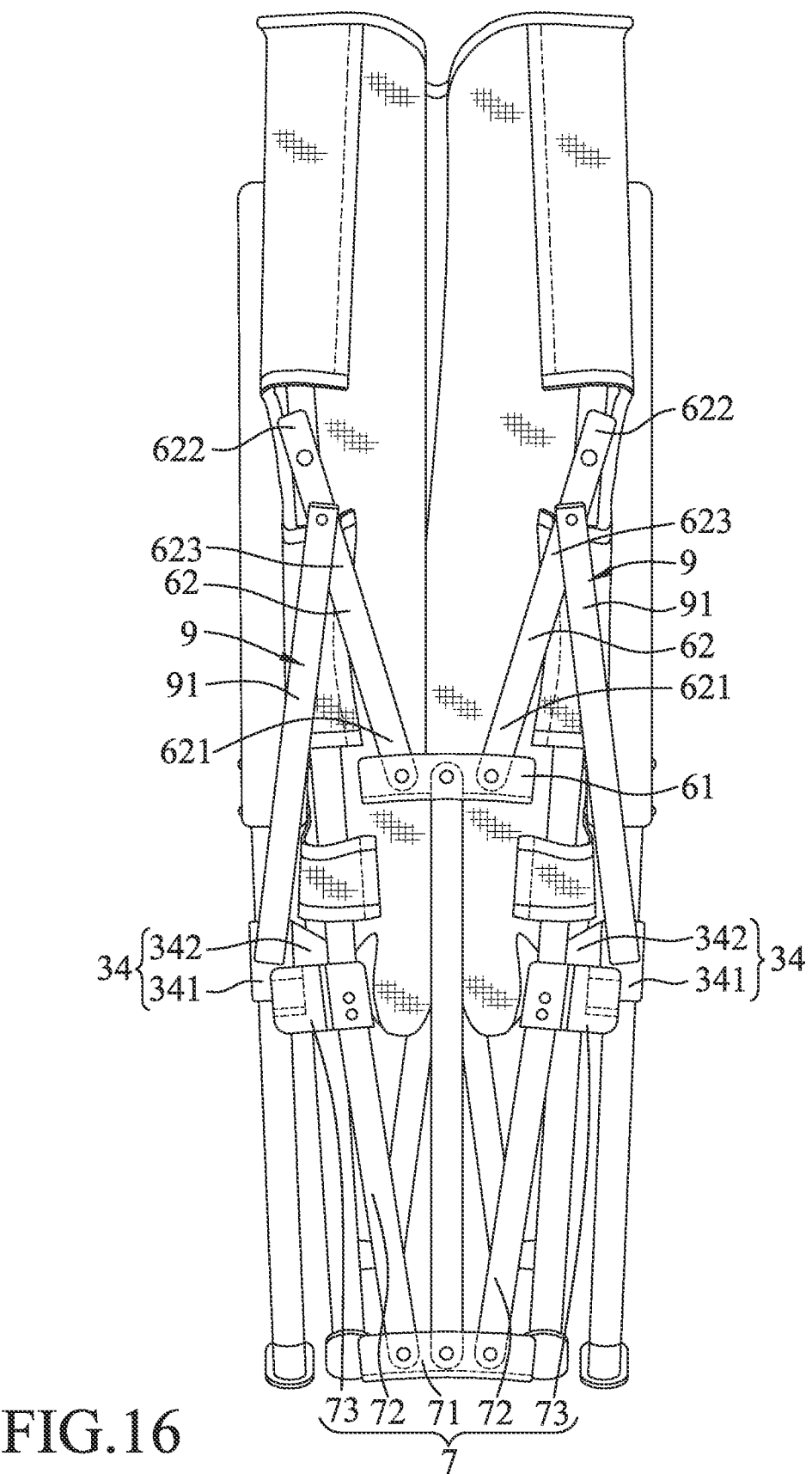
FIG. 16 is a rear view of the fourth embodiment illustrating the foldable chair in a folded state.

FIGS. 15 and 16 illustrate a foldable chair according to a fourth embodiment of the disclosure, which has a structure generally similar to that of the second embodiment. However, in this embodiment, the linking rod 91 of each linking rod unit 9 is pivotally connected between the intermediate portion 623 of one of the first rods 62 and the sleeve member 34 of one of the leg units 3.

Figure 17:
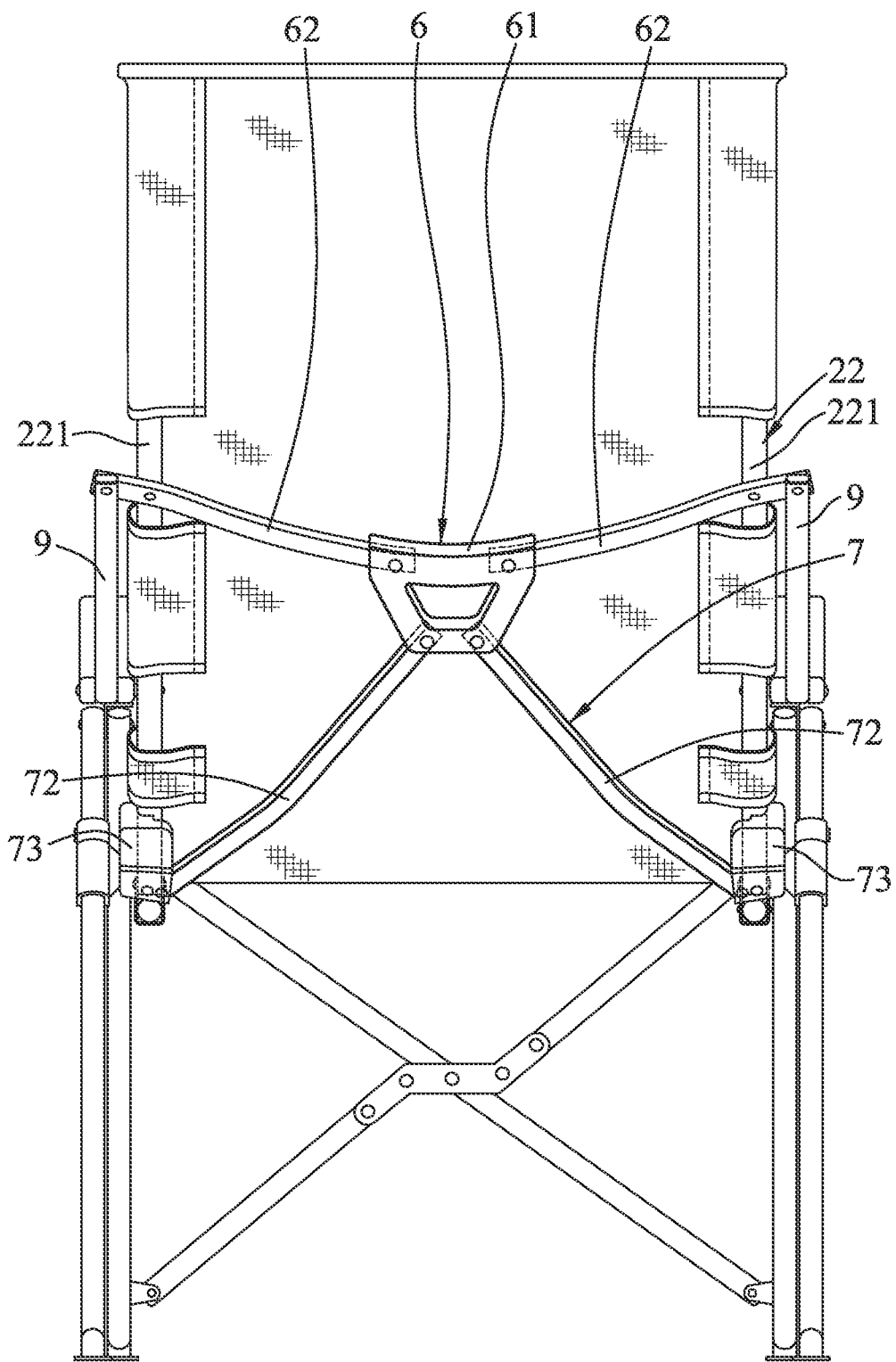
FIG. 17 is a rear view illustrating a foldable chair according to a fifth embodiment of the disclosure in a stretched state.
Figure 18:
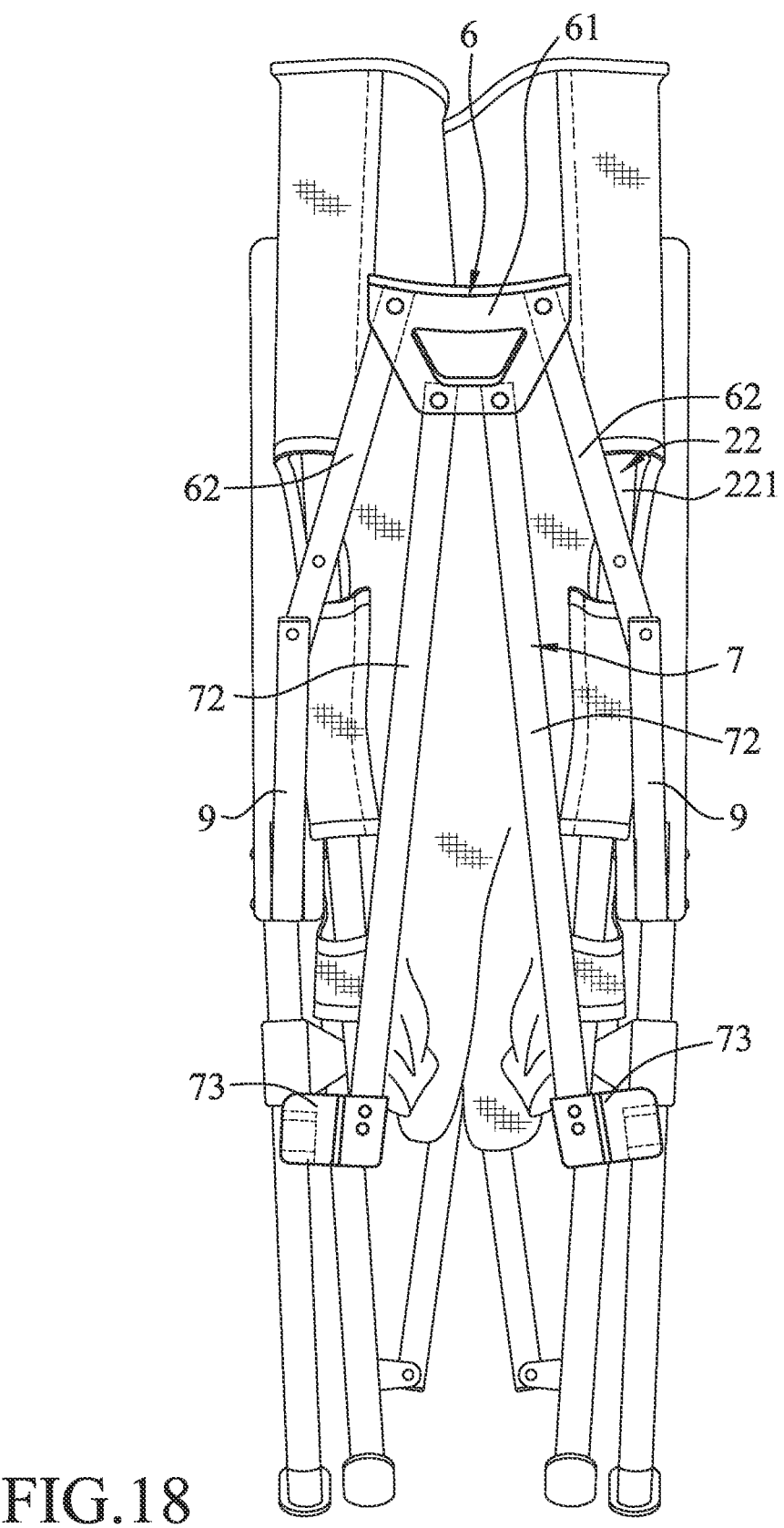
FIG. 18 is a rear view of the fifth embodiment illustrating the foldable chair in a folded state.

FIGS. 17 and 18 illustrate a foldable chair according to a fifth embodiment of the disclosure, which has a structure generally similar to that of the first embodiment. However, in this embodiment, the first hinge seat 61 has a different configuration; the second hinge seat 71 is omitted from the second foldable rod unit 7; the third rod unit 8 is omitted. Each second rod 72 has an end pivotally connected to the first hinge seat 61. Each third hinge seat 73 is pivotally connected to one of the backrest rods 221.

Figure 19:
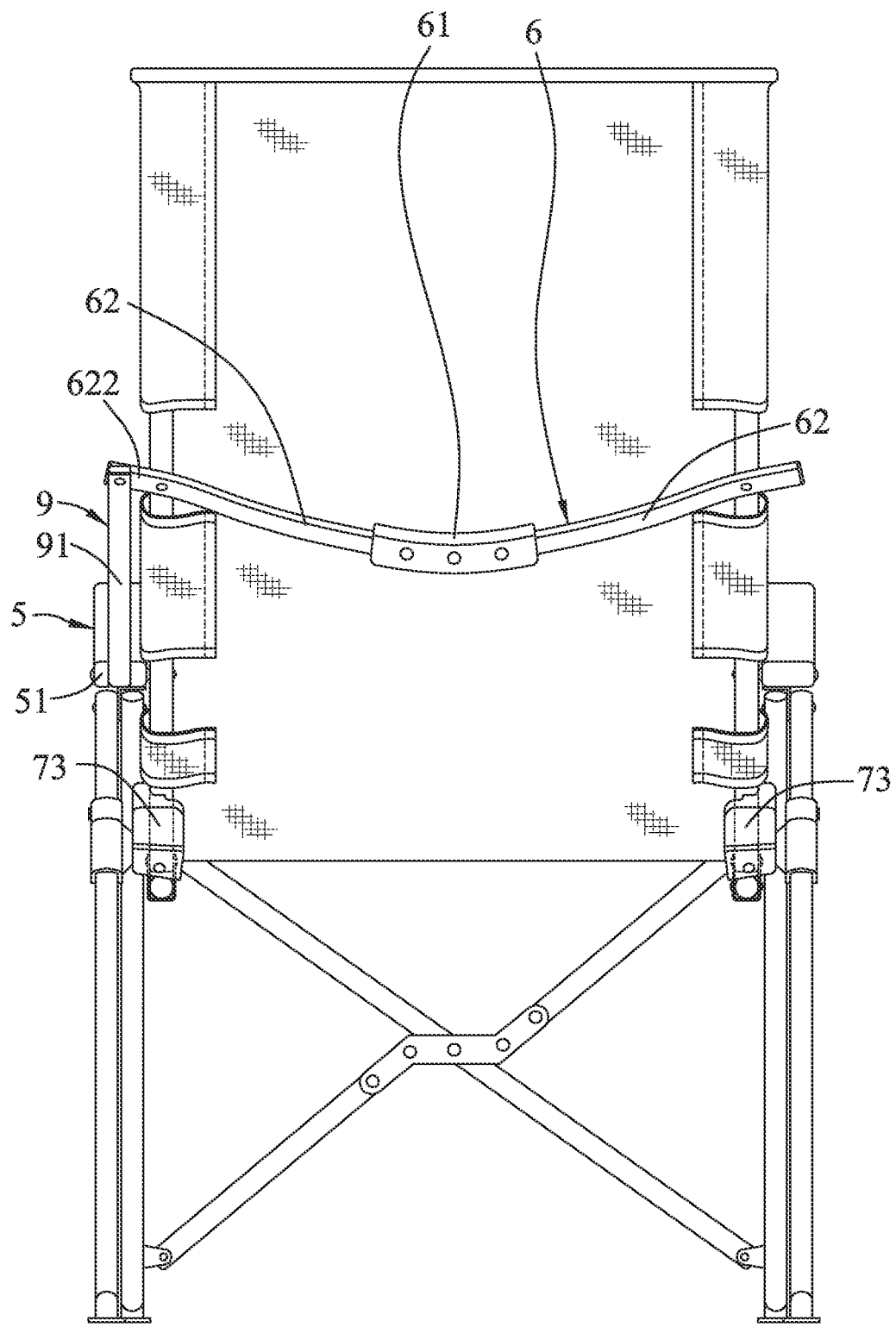
FIG. 19 is a rear view illustrating a foldable chair according to a sixth embodiment of the disclosure in a stretched state.

FIG. 19 illustrates a foldable chair according to a sixth embodiment of the disclosure, which has a structure generally similar to that of the first embodiment. However, in this embodiment, the second hinge seat 71 and the second rods 72 of the second foldable rod unit 7 are omitted; the third rod unit 8 is omitted. Only one linking rod unit 9 is included in the foldable chair of the disclosure. The linking rod 91 has an end pivotally connected to the second end portion 622 of one of the first rods 62 situated at the same side as the linking rod 91, and the other end pivotally connected to the rear end of the armrest member 51 of one of the armrest units 5 that is located at the same side as the linking rod 91.

Figure 20:
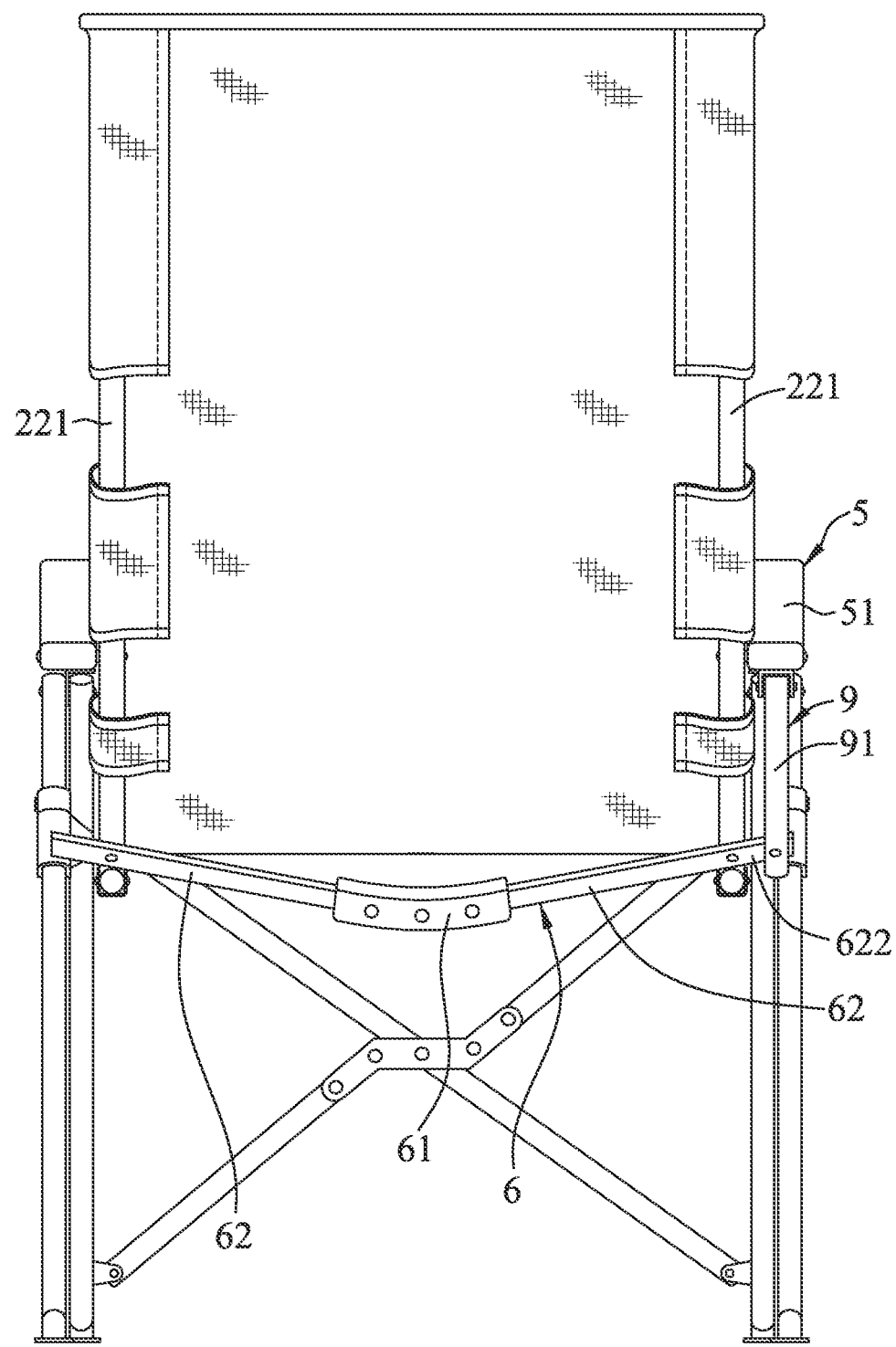
FIG. 20 is a rear view illustrating a foldable chair according to a seventh embodiment of the disclosure in a stretched state.

FIG. 20 illustrates a foldable chair according to a seventh embodiment of the disclosure, which has a structure generally similar to that of the first embodiment. However, in this embodiment, the second foldable rod unit 7 is omitted; the first foldable rod unit 6 is pivotally connected between bottom ends of the backrest rods 221. Only one linking rod unit 9 is included in the foldable chair of the disclosure. The linking rod 91 has an end pivotally connected to the second end portion 622 of one of the first rods 62 situated at the same side as the linking rod 91, and the other end pivotally connected to the rear end of the armrest member 51 of one of the armrest units 5 that is located at the same side as the linking rod 91.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A foldable chair, comprising:
   a seat unit;
   a backrest unit including two backrest rods spaced apart from each other in a left-right direction and disposed above and hinged to said seat unit;
   two leg units spaced apart from each other in the left-right direction, each of said leg units including a front leg rod pivotally connected to said seat unit, a rear leg rod pivotally connected to said front leg rod, and a sleeve member pivotally connected to said seat unit and slidably sleeved on said rear leg rod;
   two armrest units each of which is pivotally connected to one of said leg units and one of said backrest rods;
   a first foldable rod unit pivotally connected between said backrest rods and foldable or unfoldable to move said backrest rods toward or away from each other; and
   at least one linking rod unit including an end pivotally connected to said first foldable rod unit, and another end directly pivotally connected to one of said armrest units, or one of said sleeve members of said leg units.

2. The foldable chair as claimed in claim 1, wherein said at least one linking rod unit includes two linking rod unit, each of said linking rod units including an end pivotally connected to said first foldable rod unit, and another end pivotally connected to one of said armrest units or one of said sleeve members of said leg units.

3. The foldable chair as claimed in claim 2, wherein said first foldable rod unit includes a first hinge seat and two first rods, said first hinge seat being disposed between said backrest rods, each of said first rods being connected between said first hinge seat and one of said backrest rods, each of said first rods having a first end portion, a second end portion opposite to said first end portion, and an intermediate portion connected between said first and second end portions.

4. The foldable chair as claimed in claim 3, wherein said first end portion of each of said first rods is pivotally connected to said first hinge seat, said intermediate portion of each of said first connecting rods being pivotally connected to one of said backrest rods, said second end portion of each of said first rods protruding outwardly from said one of said backrest rods to which said intermediate rod portion is pivotally connected, each of said linking rod units being pivotally connected between a rear end of one of said armrest units and said second end portion of one of said first rods.

5. The foldable chair as claimed in claim 3, wherein said first end portion of each of said first rods is pivotally connected to said first hinge seat, said second end portion of each of said first rods being pivotally connected to one of said backrest rods, each of said linking rod units being pivotally connected between a rear end of one of said armrest units and said intermediate portion of one of said first rods.

6. The foldable chair as claimed in claim 3, wherein said first end portion of each of said first rods is pivotally connected to said first hinge seat, said intermediate portion of each of said first rods being pivotally connected to one of said backrest rods, said second end portion of each of said first rods protruding outwardly from said one of said backrest rods to which said intermediate portion is pivotally connected, each of said linking rod units being pivotally connected between said second end portion of one of said first rods and said sleeve member of one of said leg units.

7. The foldable chair as claimed in claim 3, wherein said first end portion of each of said first rods is pivotally connected to said first hinge seat, said second end portion of each of said first rods being pivotally connected to one of said backrest rods, each of said linking rod units being pivotally connected between said intermediate portion of one of said first rods and said sleeve member of one of said leg units.

8. The foldable chair as claimed in claim 1, further comprising a second foldable rod unit disposed below said first foldable rod unit, said second foldable rod unit including a second hinge seat disposed between said backrest rods, and two second rods, each of said second rods being pivotally connected between said second hinge seat and one of said backrest rods.

9. The foldable chair as claimed in claim 8, further comprising a third rod unit pivotally connected between said first and second hinge seats, said third rod unit being movable together with said first and second hinge seats and said first and second rods.

10. The foldable chair as claimed in claim 3, further comprising a second foldable rod unit that includes two second rods, each of said second rods being pivotally connected between said first hinge seat of said first foldable rod unit and one of said backrest rods.

* * * * *